UNITED STATES PATENT OFFICE.

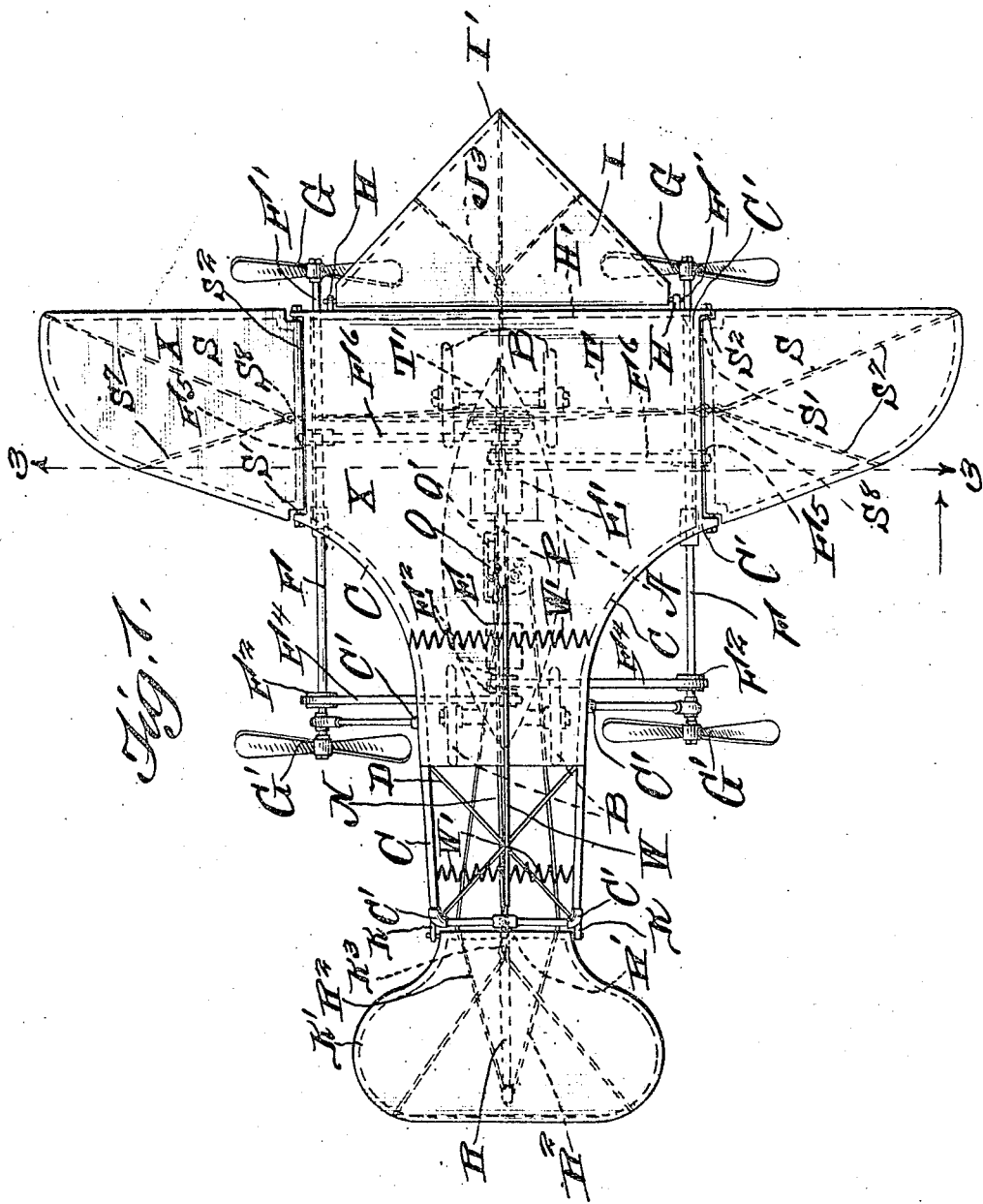

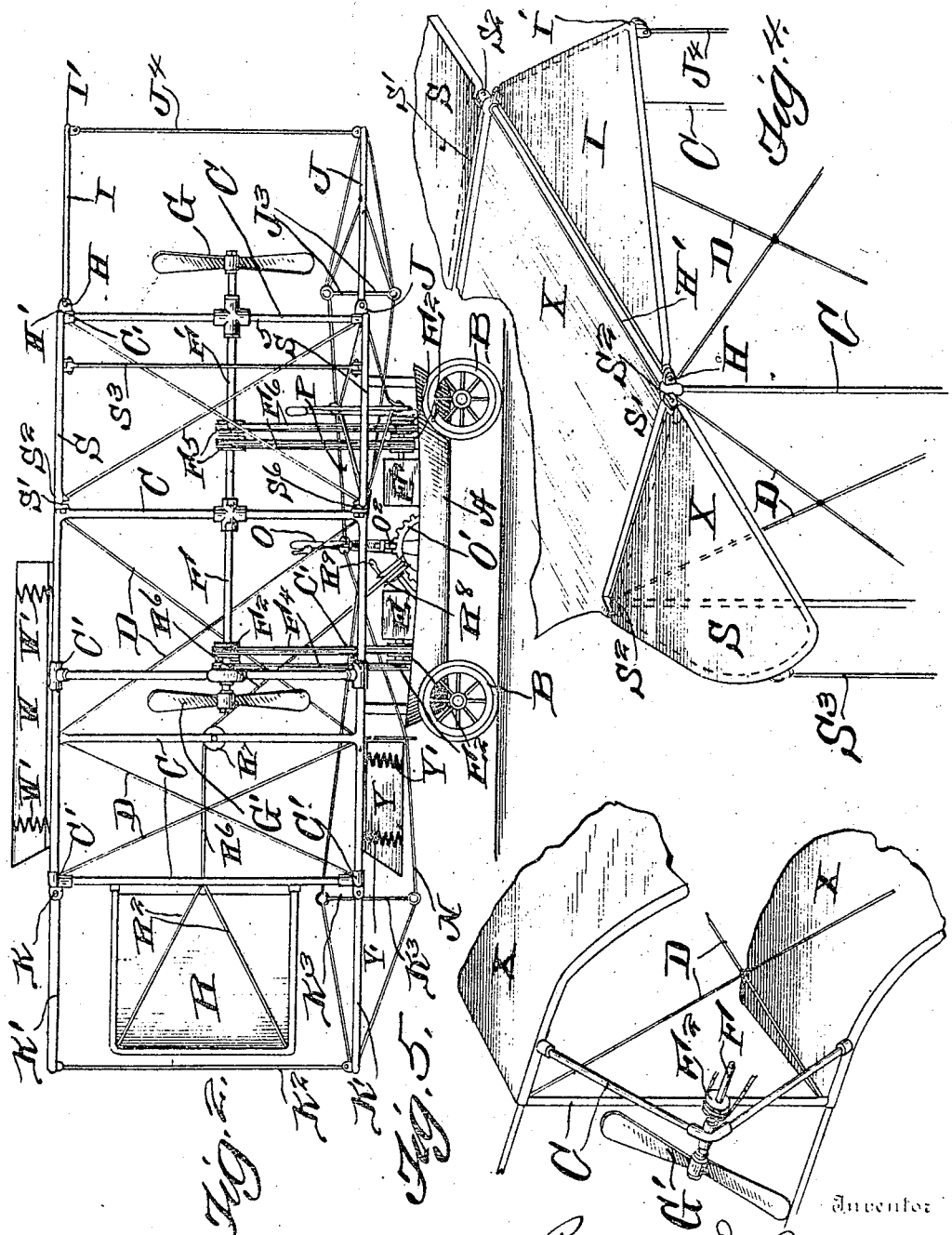

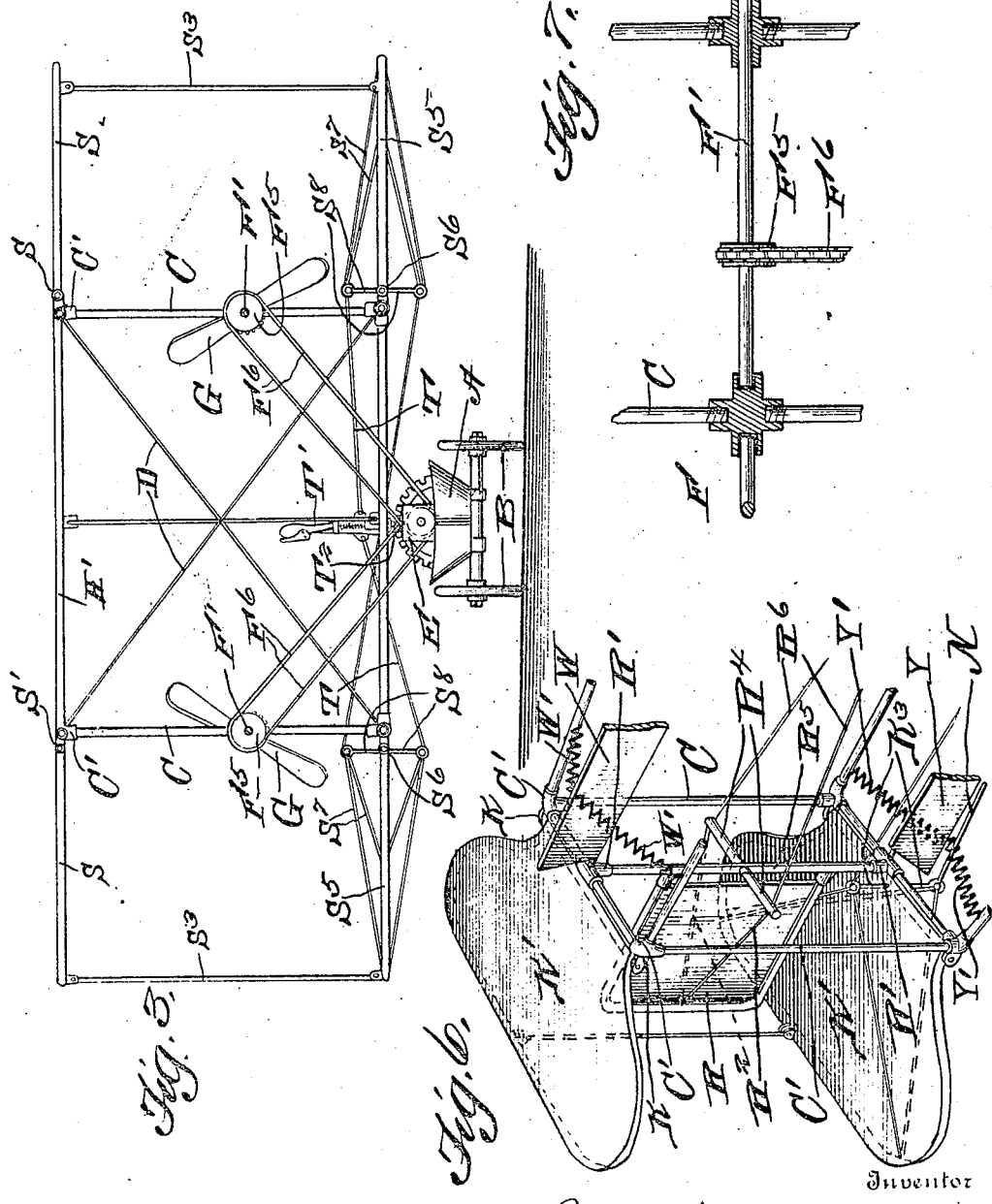

ROMAIN DE BERSAQUES, OF WASHINGTON, DISTRICT OF COLUMBIA, ASSIGNOR TO DE BERSAQUES SAFETY AEROPLANE CO., A CORPORATION OF SOUTH DAKOTA.

AEROPLANE.

967,711.  Specification of Letters Patent.  Patented Aug. 16, 1910.

Application filed August 14, 1909. Serial No. 512,864.

*To all whom it may concern:*

Be it known that I, ROMAIN DE BERSAQUES, a citizen of the United States, residing at Washington, in the District of Columbia, have invented certain new and useful Improvements in Aeroplanes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in aeroplanes and comprises various details of construction, combinations and arrangements of parts which will be hereinafter fully described and then specifically defined in the appended claims.

I illustrate my invention in the accompanying drawings, in which:—

Figure 1 is a top plan view of the apparatus. Fig. 2 is a side elevation of the invention. Fig. 3 is a sectional view on line 3—3 of Fig. 1. Fig. 4 is a detail perspective view of a portion of the invention. Fig. 5 is a detail perspective view showing one of the propellers. Fig. 6 is a detail perspective view of the rear rudders, and Fig. 7 is a detail sectional view showing the manner of connecting sections of the frame.

Reference now being had to the details of the drawings by letter, A designates the body portion of the car, made preferably in the shape of a boat and provided with wheels B, affording means whereby the device may be supported on the ground and to assist in making an ascension without the use of any auxiliary starting apparatus other than the motor of the craft. The frame of the machine is made up of sections C which may be tubular or solid as may be desired and of any suitable material. The ends of the sections are fastened together by the couplings C' and securely braced by means of the wires D. Mounted within the car or boat are two motors, designated respectively by letters E and E', and fixed to the shafts of the engine are the two sprocket wheels $E^2$. Journaled in suitable bearings in the frame are the horizontally disposed shafts F and F' and said shafts F have the sprocket wheels $F^2$ keyed thereto and about which and the sprocket wheels $E^2$ the sprocket chains $F^4$ pass. Similar sprocket wheels $F^5$ are fixed to the shaft F and sprocket chains $F^6$ pass about sprocket wheels $F^5$ and the sprocket wheel $E^2$ upon the shaft of the motor E'. Propellers G are fastened to the forward ends of the shaft F' and similar propellers G', reversely arranged with reference to the propellers G, are fixed to the shafts F.

Pivotally mounted upon the ears I which project from the rod $H^4$ is a horizontally disposed wing I tapering to a point I' and adapted to have a swinging movement up and down for the purpose of guiding the craft as said wings impinge against the atmosphere while being driven forward. A similar wing, designated by letter J, is pivotally mounted upon the ears J' fastened to the lower porton of the frame and said wing J is positioned underneath the wing I and parallel thereto. A rod $J^4$ connects the pointed ends of each of said wings I and J, causing the same to move in unison. Fastened to the ears K projecting from a crosspiece at the rear upper end of the frame are the rear horizontally disposed wings K' connected by a rod $K^2$. Arms $K^3$ project from the lower of the horizontally disposed wings at the rear of the apparatus and similar arms $J^3$ from the lower of the forward horizontal planes and rods N are fastened at their rear ends to the eyes formed in the ends of the arms $K^3$ and their forward ends are pivotally connected to an operating lever O which is pivoted upon a suitable support upon the car or boat. O' is a curved segment having teeth engaged by the pawl $O^2$ which is mounted upon the lever O and adapted to hold the latter in an adjusted position. Rods, designated by letters P, are pivoted at their rear ends to the lever O and their forward ends to the arms $J^3$, forming means whereby, as said lever is moved in one direction or the other, the two sets of horizontally disposed wings may be moved in unison therewith.

A vertically disposed rudder P is pivotally mounted in bearings R' and suitable brace rods $R^2$ are fastened to the outer free swinging edge of the rudder and their rear ends to the pins R⁴ which project from the rod R⁵ forming the rear portion of the rudder. Ropes or cords R⁶ are fastened to the outer ends of said pins R⁴ and pass about a pulley R⁷ and thence about a second grooved pulley R⁸ to which an operating handle R⁹ is fastened, affording means whereby, as the pulley R⁸ is rotated in one direction or the other, the rudder R may be swung to one side or the other.

Horizontally disposed wings S are pivotally mounted at S′ upon pivots S² and rods S³ connect the upper series of wings with a similar set of wings S⁵ which are pivotally connected at S⁶. Rods S⁷ are pivotally connected to the outer ends of the lower of said wings S⁵ and their inner ends are fastened to the arms S⁸ projecting from the inner hinged end of each wing S⁵ and a rod T connects each arm S⁸ with a pivotal operating lever T′ which is pivotally mounted upon the car, said lever T′ having a spring-actuated pawl T² adapted to engage a segment bar to hold the lever in an adjusted position.

Hinged to the top and along the central portion of the frame is a fin W and springs W′ are fastened at their inner ends to the free swinging edge of the fin and their outer edge to the frame, thus allowing said fin to yield in opposite directions. A similar fin, designated by letter Y, is pivoted to the bottom of the frame and has springs Y′ secured at their inner ends to the edge of the fin and their outer edge to the frame and serving to coöperate with the fins upon the top to guide the craft as it moves through the air and prevent drifting sidewise. A suitable covering of canvas or other material, designated by letter X, is provided for the upper and lower portion of the frame, forming the two aeroplanes and said wings are also covered with any suitable material, such as canvas.

In operation, it will be noted that each set of propellers, arranged in pairs, two at the front and two at the rear, are driven by independent motors, the forward set of propellers having blades which rotate to exert a pulling effect by impingement of the blades against the atmosphere, while the blades of the rear set are disposed to push and propel the apparatus. The two sets of horizontally disposed planes in front and rear which are connected together by the mechanism shown are adapted to be moved by the lever O in unison one with another for the purpose of guiding the craft up and down while the rudder R, which is operated by means of the pulley R⁸, is adapted to guide the craft laterally while the wings, designated by letters S and S⁵, are also adapted to move up and down through the medium of the lever T′ and connections therewith, thus affording means within the control of the operator for guiding the apparatus in its various movements while being driven through the atmosphere.

By the provision of the boat, means is afforded whereby the craft may be kept afloat in the event of its coming down in water and, by the provision of wheels upon the boat, means is afforded for allowing the craft to move along the surface of the ground while acquiring sufficient momentum to ascend.

What I claim to be new is:—

1. An aeroplane comprising a boat, motors therein, wheels upon which said boat is mounted, a frame, propeller shafts journaled in suitable bearings in said frame and propellers rotating with said shafts, sprocket wheel and chain connections between the engine and propeller shafts, horizontally disposed wings pivoted to the front and rear ends of the frame, lever mechanism for raising and lowering said wings in unison, a vertically disposed rudder, means for operating the same, and yielding fins projecting from the top and bottom of the frame.

2. An aeroplane comprising a boat, motors therein, wheels upon which said boat is mounted, a frame, propeller shafts journaled in suitable bearings in said frame and propellers rotating with said shafts, sprocket wheel and chain connections between the engine and propeller shafts, horizontally disposed wings hinged upon the sides of the top and bottom of the frame, connections between the same whereby they may be moved in unison up and down, and yielding fins projecting from the top and bottom of the frame.

3. An aeroplane comprising a boat, motors therein, wheels upon which said boat is mounted, a frame, propeller shafts journaled in suitable bearings in said frame and propellers rotating with said shafts, sprocket wheel and chain connections between the engine and propeller shafts, horizontally disposed wings pivoted to the front and rear ends of the frame, lever mechanism for raising and lowering said wings in unison, a vertically disposed rudder, means for operating the same, fins hinged to the top and bottom of the frame, and springs fastened to the free swinging edges of said fins and to said frame.

4. An aeroplane comprising a boat, motors therein, wheels upon which said boat is mounted, a frame, propeller shafts journaled in suitable bearings in said frame and propellers rotating with said shafts, sprocket wheel and chain connections between the engine and propeller shafts, horizontally disposed wings hinged to the front and rear ends of the frame, rods connecting said wings, arms projecting from the inner side of each of said wings, a pivotal lever, rods connecting the latter with said arms, laterally disposed wings hinged upon the sides of the frame, a rod connecting said laterally disposed wings, and lever mechanism for moving the same in unison with one another.

In testimony whereof I hereunto affix my signature in the presence of two witnesses.

ROMAIN DE BERSAQUES.

Witnesses:
A. L. HOUGH,
FRANKLIN H. HOUGH.